C. DE W. RADLIFF.
AUTOMOBILE RUNNING GEAR.
APPLICATION FILED JULY 14, 1916.
1,213,904. Patented Jan. 30, 1917.
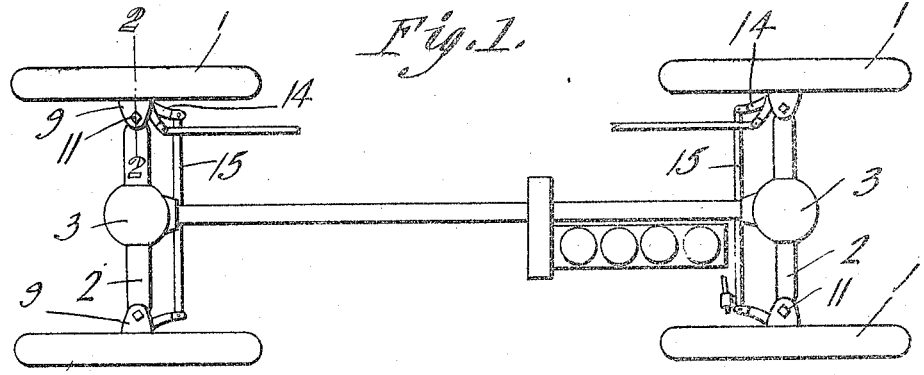
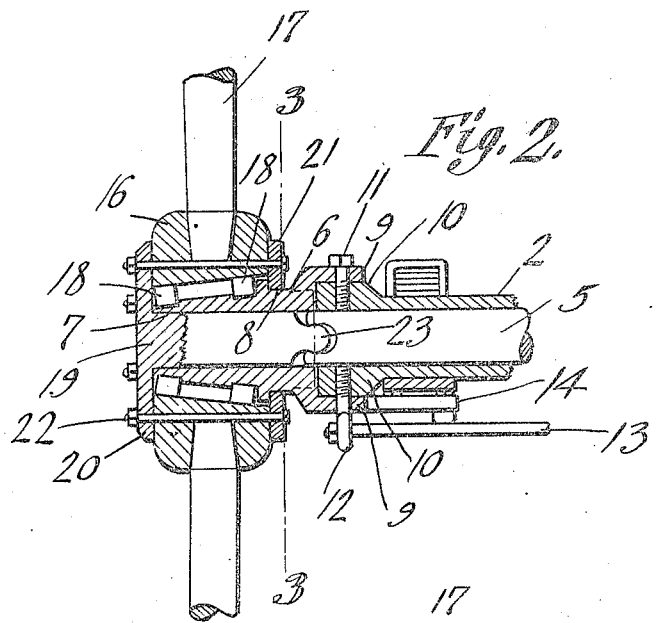
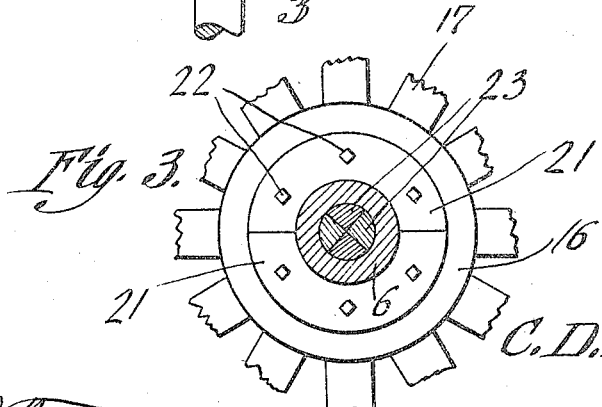
Witnesses
C. D. Radliff
Inventor
by
Attorneys

UNITED STATES PATENT OFFICE.

CHARLES DE WITT RADLIFF, OF BENCHLAND, MONTANA.

AUTOMOBILE RUNNING-GEAR.

1,213,904.

Specification of Letters Patent. Patented Jan. 30, 1917.

Application filed July 14, 1916. Serial No. 109,336.

*To all whom it may concern:*

Be it known that I, CHARLES D. RADLIFF, a citizen of the United States, residing at Benchland, in the county of Fergus and State of Montana, have invented a new and useful Automobile Running-Gear, of which the following is a specification.

The present invention appertains to running gears for automobiles, and aims to provide a novel and improved running gear wherein each of the four wheels can be driven for propelling the automobile, and can also be swung about a vertical axis for steering the machine.

The present improvements are useful upon pleasure cars, commercial cars, tractors, and the like, and this mechanism includes a novel assemblage of the component elements to enhance the utility and efficiency of the running gear.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the improved running gear. Fig. 2 is an enlarged section on the line 2—2 of Fig. 1, portions being shown in elevation. Fig. 3 is a cross section on the line 3—3 of Fig. 2.

The present running gear embodies four ground wheels 1 of suitable construction, in accordance with the use to which the running gear is to be put, and transverse axle housings 2 are disposed between the front and rear wheels, respectively, and are provided with differential cases 3, inclosing differential mechanisms which are operatively connected in any suitable manner or by a suitable transmission mechanism with an engine. The axle housings 2 house the axle shafts 5. The remote or outer ends of the shafts 5 terminate adjacent the ends of the housings 2.

Pivotally connected with the ends of the housings for swinging movements about vertical axes, are knuckles 6 having the outstanding tubular and peripherally tapered spindles 7, and the annular grooves 8 at the larger basal ends of the spindles. The knuckles 6 are provided at their inner ends with upper and lower offset ears 9 overlapping upper and lower abutments 10 with which the ends of the housings 2 are provided, and the ears 9 are apertured for the reception of upper and lower pivot bolts 11 and 12, respectively, which extend through the apertures and take into the abutments 10. The lower bolts 12 have eyes or are in the form of eye bolts, and a transverse truss rod 13 extends below each axle and has its terminals engaged through the eyes of the respective bolts 12. The ears 9 are rotatably mounted upon the bolts 11 and 12, permitting the knuckles to swing in a horizontal plane about vertical axes. The lower ears 9 are provided with arms 14 with which the steering rods 15 are pivotally connected, whereby the front and rear wheels can be angled by any suitable mechanism (not shown).

Each wheel 1 includes a hub 16 to which the spokes 17 are attached, and the hub has a tapered bore of slightly larger diameter than the circumference of the spindle 7, and anti-frictional rollers 18 are disposed between the spindle and hub, whereby the wheel can rotate with a minimum amount of friction.

As a means for holding the wheel upon the spindle and for connecting the wheel with the respective axle shaft 5, a stub shaft 19 is retatable within the spindle 7 and is provided at its outer end with a head or disk 20 overlapping the outer side of the hub 16. A ring 21 composed of sections, as seen in Fig. 3, rests against the inner side of the hub 12 and fits within the groove 8 to bear against the shoulder formed by said groove at the larger end of the spindle 7, and the disk 20 and ring 21 are connected by bolts 22 extending through the hub 16, whereby the stub shaft 19 is rigidly secured to the hub 16, as well as the ring 21. The ring 21 in being secured to the hub and fitting within the groove 8, will hold the hub in place upon the spindle, and suitable anti-frictional bearings can be provided for reducing the friction between the rings 21 and spindles.

The adjacent ends of each driving shaft 5 and stub shaft 19 are bifurcated and rounded, as at 23, so as to interfit one another, as seen in Figs. 2 and 3, thereby providing a universal joint which will permit the stub shaft 19 to be driven from the shaft 5 at the various angular positions of said shafts relative to one another when the knuckle is swung.

The present mechanism is simple and inexpensive, and the assemblage of elements is such as to render the mechanism desirable and useful.

The joints between the knuckles 6 and housings 2 can be made dust-proof to exclude dirt from the universal joints 23, and the spindles 7 can be of any design for various ball or roller bearings.

Having thus described the invention, what is claimed as new is:

A mechanism of the character described embodying an axle housing, a shaft rotatable therein and terminating adjacent the end thereof, a steering knuckle having a tubular spindle, an annular groove at the basal end of said spindle, and offset ears overlapping and pivotally connected with the end of said housing, a wheel having a hub rotatable upon the spindle, a stub shaft rotatable within the spindle and having a disk at its outer end overlapping the outer side of the hub, a ring working in said groove and resting against the inner side of the hub, means securing said disk and ring together and extending through the hub, the adjacent ends of said shafts having interengageable portions to provide a universal joint.

In testimony that I claim the foregoing as my own, I have hereto affixed my signature in the presence of two witnesses.

CHARLES DE WITT RADLIFF.

Witnesses:
O. A. TWEED,
M. D. ECKLEY.